(No Model.)
A. SOMMER.
PROCESS OF DESULFURIZING MINERAL OILS.
No. 525,969. Patented Sept. 11, 1894.
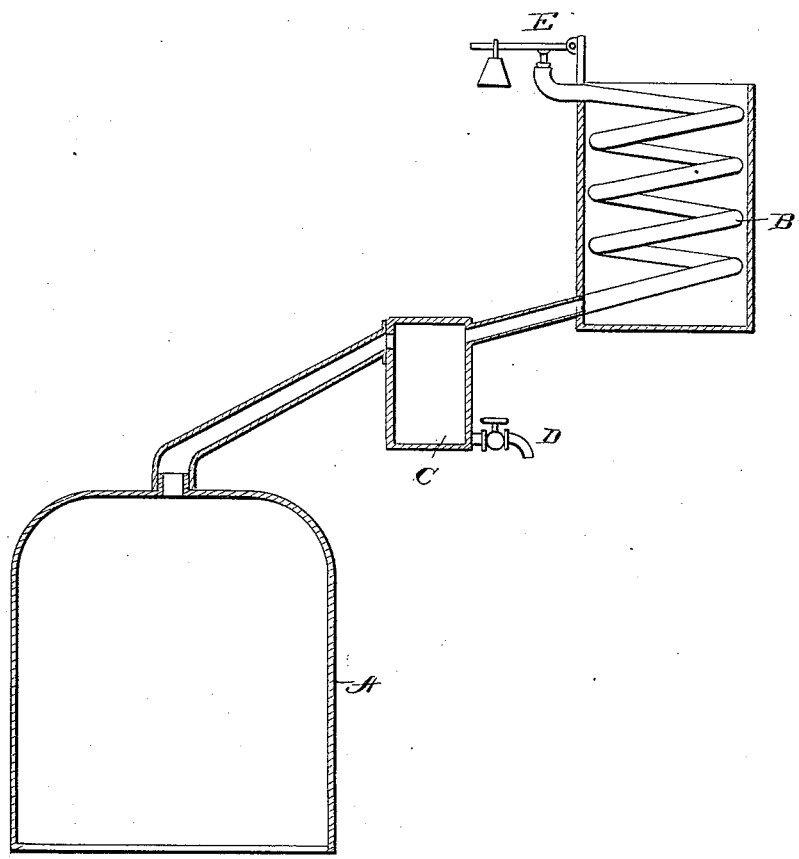
Witnesses:
J. M. Fowler Jr.
Thomas Durant
Inventor:
Adolph Sommer
By Church & Church
his Attorneys.

UNITED STATES PATENT OFFICE.

ADOLPH SOMMER, OF BERKELEY, CALIFORNIA.

PROCESS OF DESULFURIZING MINERAL OILS.

SPECIFICATION forming part of Letters Patent No. 525,969, dated September 11, 1894.

Application filed August 22, 1891. Serial No. 403,426. (No specimens.)

*To all whom it may concern:*

Be it known that I, ADOLPH SOMMER, of Berkeley, in the county of Alameda and State of California, have invented certain new and useful Improvements in Processes of Desulfurizing Mineral Oils; and I do hereby declare the following to be a full, clear, and exact description of the same.

Mineral oils which contain an appreciable quantity of sulphur are generally characterized by an exceedingly disagreeable odor that renders them unfit for many technical purposes and greatly lessens their commercial value.

The sulphur occurs principally in combination with hydrogen and with unsaturated hydro-carbons, and is frequently accompanied by small quantities of similar arsenic- and antimony-compounds. The removal of the hydrogen compounds of sulphur is a comparatively easy matter. Almost any basic or alkaline substance which has an affinity for sulphur will accomplish this purpose. But the removal of that portion of the sulphur which is in combination with hydrocarbons is far more difficult and cannot be accomplished by a mere digestion with the ordinary alkalies or metallic oxides.

Various metallic compounds have been suggested and are to some extent employed for removing the sulphur from such oils; but some which are employed in the dry state (as for instance the oxides of iron, manganese, copper) are active only at comparatively high temperatures, and cause a great loss of the more valuable portion of the oil; while others, which are used in the liquid state (such as the solution of plumbate of soda, chloride of lime and sulphuric acid, chloride of sulphur), leave in or introduce into the oil certain undesirable substances. Now I have found that by treating the mineral oil with a dry copper salt, best of all the anhydrous sulphate of copper, the offensive sulphur- (as well as the arsenic- and antimony-) compounds can be broken up and the sulphur (arsenic and antimony) completely abstracted at comparatively low temperatures. The principal end-products of the reaction between the anhydrous sulphate of copper and the sulphur compounds of the oil are, besides the pure hydrocarbons, sulphur dioxide ($SO_2$), carbon dioxide ($CO_2$), carbon monoxide (CO), water, a black carbonaceous substance and sulphide of copper.

The reaction is influenced by the temperature as well as by the degree of dehydration of the reagents. The higher the temperature to which the reagents are exposed, and the less water they contain, the more rapid and perfect is the desulphurization. At temperatures below 100° centigrade, the reaction is very slow, but it becomes more energetic as the temperature approaches 130° centigrade, and is most active at or above that temperature.

If water is present in any appreciable quantity, the reaction does not take place at all. Even the water of crystallization contained in the commercial sulphate of copper (bluestone) interferes with the reaction. On this account it is advisable to heat the sulphate of copper until it has lost all or nearly all of its water of crystallization, before it is employed in this process; yet in cases in which the oil and the sulphate of copper can be subjected to a temperature which dehydrates the copper salt, this previous drying may be omitted.

The particular manner in which the mineral oil is to be treated with the copper salt depends mainly upon the character of the oil and the length of time in which the operation must be completed. When the saving of time is no object, the treatment may be carried on at the ordinary temperature. In this case the copper salt may be either mixed with or suspended in the oil, and the two left standing for some weeks, until the oil has lost its offensive odor. But when the treatment is to be finished within a short time, it must be carried on at an elevated temperature.

If no appreciable portion of the oil is volatilizable at 130° centigrade, or if the portion which is volatile at this temperature need not be desulphurized, the oil and sulphate of copper may simply be mixed and digested in any suitable vessel at or above 130° centigrade. By keeping the mixture agitated, or by placing the copper salt upon frames or by otherwise suspending the same in the oil so as to permit easy diffusion the desulphurization is very much accelerated.

In using this method in the purification of petroleum burning oils, I preferably distill off the naphtha first, and, when the contents of the still have reached 130° centigrade or over, I introduce the finely powdered anhydrous sulphate of copper. I then either digest the mixture of sulphate of copper and oil in the heated state, or I distill the oil from the sulphate of copper. In both cases the copper salt is kept well suspended or floating in the oil by means of a stirrer almost touching the bottom of the digester or still. If, however, the mineral oil contains an appreciable quantity of volatile matter which is to be also desulphurized, then one of the following modifications has to be employed.

Referring to the drawing the oil and copper salt may be placed into a closed digesting apparatus A which is connected with an inverted condenser B and also provided with a trap C at the point of intersection with the condenser. The trap has an outlet D that can be readily opened and closed. The contents of the digester are heated and kept at or near 130° centigrade. If the oil contains so much volatile matter, that the temperature of 130° centigrade would cause the contents of the still to boil over, the vapor within the apparatus should be kept under pressure.

To guard against explosion of the apparatus, a safety valve E is attached to the upper end of the condenser, which permits the vapors to escape, when the pressure within has reached a predetermined point. Under these conditions the following ensues: By heating, the lighter portion of the oil as well as the water which is formed during the reaction is vaporized. The vapors condense in the inverted condenser, and their liquid products flow down into the trap. Here the water sinks, owing to its greater specific gravity, into the lower portion of the trap, while the light hydrocarbon overflows the trap and runs back into the body of the digester. The sulphur dioxide and other gases escape by the open end of the inverted condenser or through the safety valve. In this manner the digestion of the oil is continued, until a sample of the light hydrocarbon drawn from the trap proves to be free from the objectionable constituents. This point can be determined with greater accuracy than by the mere odor by means of the plumbate of soda test. If, upon shaking a few cubic centimeters of the hydrocarbon sample with a few drops of solution of plumbate of soda, the hydrocarbon is darkened, either at once or upon standing, some of the sulphur compounds are still present and the digestion should be continued; but if after standing half an hour the hydrocarbon is left uncolored, it proves that the desulphurization is complete. When this point has been reached the outlet of the trap is opened and the oil distilled in the usual manner.

From the residues of the foregoing operations (which residues should preferably be withdrawn in the liquid state) the sulphide of copper is recovered by allowing it to settle and by finally washing and pressing it. At last it is reconverted by roasting, &c., into sulphate of copper in the manner well known to chemists.

The dioxide of sulphur given off during the desulphurization of the oil as well as during the roasting of the residual sulphide of copper may be used for the manufacture of sulphuric acid.

I am aware that a patent has been granted on a process for desulphurizing petroleum by heating it to boiling with a mixture consisting of cupric hydroxide and a solution of hydroxide, chloride and sulphate of sodium, which mixture is to be prepared by dissolving in every two gallons of water one pound each of sulphate of copper, caustic soda and common salt; but this process does not anticipate my invention for the following reasons: First. In the former patent no sulphate of copper or any other combination (salt) of copper with an acid radical comes in contact with or reacts upon the oil, the sulphate of copper having been converted by the caustic soda into hydroxide of copper; while in my case the copper salt (anhydrous sulphate of copper) comes as such in contact with the oil and reacts upon the sulphur compounds of the oil. Second. In the former patent the hydroxides of copper and sodium are used in combination with much water; while in my process the copper salt is employed in as dry a state as it can conveniently be prepared.

Having thus described my invention, what I claim as new, and desire to secure by Letters Patent, is—

1. The herein described improvement in the process of desulphurizing mineral oils consisting in digesting them with dry sulphate of copper; substantially as described.

2. The herein described improvement in the process of desulphurizing mineral oils, which consists in digesting the oil under pressure with anhydrous sulphate of copper at a temperature of about or above 130° centigrade; substantially as described.

ADOLPH SOMMER.

Witnesses:
 ALEX. S. STEUART,
 THOMAS DURANT.